United States Patent
Oh et al.

(10) Patent No.: US 10,734,678 B2
(45) Date of Patent: Aug. 4, 2020

(54) COMPOSITION FOR GEL POLYMER ELECTROLYTE AND LITHIUM SECONDARY BATTERY INCLUDING THE SAME

(71) Applicant: LG Chem, Ltd., Seoul (KR)

(72) Inventors: Jeong Woo Oh, Daejeon (KR); Kyoung Ho Ahn, Daejeon (KR); Chul Haeng Lee, Daejeon (KR); Yi Jin Jung, Daejeon (KR); Sol Ji Park, Daejeon (KR)

(73) Assignee: LG Chem, Ltd. (KR)

( * ) Notice: Subject to any disclaimer, the term of this patent is extended or adjusted under 35 U.S.C. 154(b) by 85 days.

(21) Appl. No.: 15/736,868

(22) PCT Filed: Feb. 20, 2017

(86) PCT No.: PCT/KR2017/001830
§ 371 (c)(1),
(2) Date: Dec. 15, 2017

(87) PCT Pub. No.: WO2017/146426
PCT Pub. Date: Aug. 31, 2017

(65) Prior Publication Data
US 2018/0171063 A1 Jun. 21, 2018

(30) Foreign Application Priority Data
Feb. 25, 2016 (KR) .................. 10-2016-0022668

(51) Int. Cl.
| | | |
|---|---|---|
| *H01M 10/0565* | (2010.01) | |
| *H01M 4/131* | (2010.01) | |
| *H01M 10/0569* | (2010.01) | |
| *H01M 10/0568* | (2010.01) | |
| *H01M 10/052* | (2010.01) | |
| *C09D 175/04* | (2006.01) | |
| *H01M 2/10* | (2006.01) | |
| *C08F 220/44* | (2006.01) | |
| *C08G 18/70* | (2006.01) | |
| *C08G 18/72* | (2006.01) | |
| *C08G 63/02* | (2006.01) | |
| *C08K 5/14* | (2006.01) | |
| *C08K 5/23* | (2006.01) | |
| *C08L 75/16* | (2006.01) | |
| *H01M 10/0525* | (2010.01) | |
| *H01M 10/0567* | (2010.01) | |
| *H01M 4/02* | (2006.01) | |

(52) U.S. Cl.
CPC ....... *H01M 10/0565* (2013.01); *C08F 220/44* (2013.01); *C08G 18/702* (2013.01); *C08G 18/728* (2013.01); *C08G 63/02* (2013.01); *C08K 5/14* (2013.01); *C08K 5/23* (2013.01); *C08L 75/16* (2013.01); *C09D 175/04* (2013.01); *H01M 2/10* (2013.01); *H01M 4/131* (2013.01); *H01M 10/052* (2013.01); *H01M 10/0525* (2013.01); *H01M 10/0567* (2013.01); *H01M 10/0568* (2013.01); *H01M 10/0569* (2013.01); *H01M 2004/027* (2013.01); *H01M 2004/028* (2013.01); *H01M 2300/0094* (2013.01); *Y02T 10/7011* (2013.01)

(58) Field of Classification Search
CPC ...... H01M 2/10; H01M 4/131; H01M 10/052; H01M 10/0525; H01M 10/0565; H01M 10/0567; H01M 10/0569; H01M 2004/028; H01M 2300/0094; H01M 10/0568; C09D 175/04; Y02T 10/7011; C08F 220/44; C08G 18/702; C08G 18/728; C08L 75/16
See application file for complete search history.

(56) References Cited

U.S. PATENT DOCUMENTS

| | | | | |
|---|---|---|---|---|
| 6,201,071 B1 * | 3/2001 | Miura | .......... | C08G 65/22 429/311 |
| 2002/0042001 A1 * | 4/2002 | Lee | .......... | H01M 10/0565 429/314 |

(Continued)

FOREIGN PATENT DOCUMENTS

| | | |
|---|---|---|
| EP | 3041078 A1 | 7/2016 |
| JP | 2001176555 A | 6/2001 |

(Continued)

OTHER PUBLICATIONS

Machine translation of Ishida et al., JP 2002033015 A. (Year: 2019).*

(Continued)

*Primary Examiner* — Laura Weiner
(74) *Attorney, Agent, or Firm* — Lerner, David, Littenberg, Krumholz & Menlik, LLP

(57) ABSTRACT

The present invention relates to a composition for a gel polymer electrolyte and a lithium secondary battery including the same, and more specifically, an objective of the present invention is to provide a secondary battery in which, since an isocyanate-containing monomer is introduced to a composition for a gel polymer electrolyte to induce a urethane reaction with LiOH on a surface of a lithium transition metal oxide to form a coating layer including a urethane bond-containing oligomer on the surface of the lithium transition metal oxide, and thereby side reactions caused by HF in the battery are minimized, capacity characteristics are improved, and adhesion between a positive electrode and a separator is enhanced to minimize the swelling phenomenon of the battery.

10 Claims, 2 Drawing Sheets

(56) References Cited

U.S. PATENT DOCUMENTS

| | | |
|---|---|---|
| 2003/0059681 A1 | 3/2003 | Noh |
| 2003/0104282 A1* | 6/2003 | Xing .................... H01M 4/661 429/303 |
| 2014/0287325 A1 | 9/2014 | Abe et al. |
| 2015/0017530 A1 | 1/2015 | Ahn et al. |

FOREIGN PATENT DOCUMENTS

| | | | |
|---|---|---|---|
| JP | 2002033015 A | * | 1/2002 |
| JP | 2002033015 A | | 1/2002 |
| KR | 20030015709 A | | 2/2003 |
| KR | 20030030552 A | | 4/2003 |
| KR | 20150007977 A | | 1/2015 |

OTHER PUBLICATIONS

Extended European Search Report for Application No. EP17756764 dated Feb. 9, 2018.
International Search Report From PCT/KR2017/001830 dated May 31, 2017.

\* cited by examiner

COMPOSITION FOR GEL POLYMER ELECTROLYTE AND LITHIUM SECONDARY BATTERY INCLUDING THE SAME

CROSS-REFERENCE TO RELATED APPLICATION

This application is a national phase entry under 35 U.S.C. § 371 of International Application No. PCT/KR2017/001830, filed Feb. 20, 2017 which claims priority to Korean Patent Application No. 10-2016-0022668, filed Feb. 25, 2016, the disclosures of which are incorporated herein by reference.

TECHNICAL FIELD

The present invention relates to a composition for a gel polymer electrolyte and a lithium secondary battery including the same, and more specifically to a composition for a gel polymer electrolyte which can form a coating layer including a urethane bond-containing oligomer on a surface of a lithium transition metal oxide, and a lithium secondary battery including the same.

BACKGROUND ART

Recently, the application of energy storage technology has expanded to cell phones, camcorders, notebook PCs and electric vehicles, resulting in intensive research and development on batteries.

In this regard, lithium secondary batteries are one of the subjects of great interest. Particularly, according to the recent trend that electronics become downsized and lightweight, development of the lithium secondary batteries having a smaller size and a light weight and capable of charging and discharging at a high capacity has been the focus of attention.

Generally, the lithium secondary battery may be prepared using a positive electrode and a negative electrode including an electrode active material which may intercalate and deintercalate lithium ions, and an electrolyte which is a delivering medium of lithium ions. Conventionally, a liquid electrolyte, in particular, an ion conductive organic liquid electrolyte prepared by dissolving salts in a non-aqueous electrolyte solvent has been mainly used as the electrolyte.

However, there is a problem in that the liquid electrolyte may leak during operation, and ignition, explosion and the like are caused due to high flammability of the non-aqueous electrolyte solvent used. Moreover, in the liquid electrolyte, a carbonate organic solvent may decompose during charging and discharging of a lithium secondary battery, or side reactions with the electrode may be caused to generate gas in a battery. In the case of storage at a high temperature, this reaction is accelerated, leading to an increase in gas production. The gas generated continuously causes an increase in internal pressure of a battery, thereby not only causing deformation of the battery such as expansion of the thickness of the battery and the like, but also causing a local difference in the adhesion at the electrode surface in the battery, resulting in the problem that the electrode reaction does not equally occur on the entire electrode surface.

Thus, in order to overcome a safety problem of the liquid electrolyte, there has recently been proposed a method of using a polymer electrolyte which is free from leakage and the like. Examples of the polymer electrolyte include a completely solid polymer electrolyte containing no organic electrolyte and a gel polymer electrolyte containing an organic electrolyte.

The gel polymer electrolyte is prepared by impregnating a polymer matrix formed by the polymerization reaction of a polymerizable monomer and a polymerization initiator with an electrolyte containing an electrolyte salt and an electrolyte solvent, and then gelling the mixture.

The gel polymer electrolyte is superior in electrochemical stability to a conventional liquid electrolyte so that the thickness of the battery may be maintained constant, can suppress shrinkage of a separator at a high temperature by strengthening the separator, and enables the manufacture of a thin film battery because contact between the electrode and the electrolyte is excellent due to the inherent adhesion of the gel.

However, since a non-aqueous electrolyte solvent is also used in the gel polymer electrolyte, the gel polymer electrolyte has inferior battery performance as compared with the liquid electrolyte.

In order to improve the conductivity of the gel polymer electrolyte, efforts have been made to improve the conductivity of the polymer electrolyte by adding a low molecular weight polyalkylene oxide or an organic solvent as a plasticizer. However, when the content of plasticizer is increased, the physical properties of the polymer electrolyte are greatly deteriorated, or it is impossible to form a stable gel.

Research was conducted by the inventors of the present invention to overcome the above-described problems, and the research resulted in the finding of a secondary battery having high electrochemical stability and excellent battery performance by introducing an isocyanate-containing monomer to a composition for a gel polymer electrolyte to form a coating layer including a urethane bond-containing oligomer on a surface of a lithium transition metal oxide.

DISCLOSURE

Technical Problem

The present invention relates to a composition for a gel polymer electrolyte and a lithium secondary battery including the same, and more specifically, an objective of the present invention is to provide a secondary battery in which, since an isocyanate-containing monomer is introduced to a composition for a gel polymer electrolyte to induce a urethane reaction with LiOH on a surface of a lithium transition metal oxide to form a coating layer including a urethane bond-containing oligomer on the surface of the lithium transition metal oxide, and thereby side reactions caused by HF in the battery are minimized, capacity characteristics are improved, and adhesion between a positive electrode and a separator is enhanced to minimize the swelling phenomenon of the battery.

Technical Solution

In order to achieve the above-described objective, the present invention provides a composition for a gel polymer electrolyte including a solvent, a lithium salt and a first monomer represented by the following Formula 1.

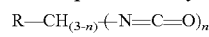 [Formula 1]

In Formula 1, R is a $C_{1-5}$ alkyl group, a $C_{1-20}$ aryl group, or a $C_{1-5}$ alkyl group or a $C_{1-20}$ aryl group including an acrylate group or a methacrylate group, and n is an integer of 1 to 3.

Further, the present invention provides a positive electrode including a lithium transition metal oxide; and a coating layer including a urethane bond-containing oligomer represented by the following Formula 2 on a surface of the lithium transition metal oxide.

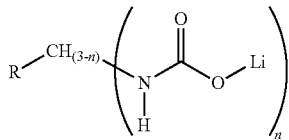

[Formula 2]

In Formula 2, R is a $C_{1-5}$ alkyl group, a $C_{1-20}$ aryl group, or a $C_{1-5}$ alkyl group or a $C_{1-20}$ aryl group including an acrylate group or a methacrylate group, and n is an integer of 1 to 3.

Moreover, the present invention provides a lithium secondary battery including the positive electrode, a battery module and a battery pack.

Advantageous Effects

In the present invention, an isocyanate-containing monomer is introduced to a composition for a gel polymer electrolyte to induce a urethane reaction with LiOH on a surface of a lithium transition metal oxide to form a coating layer including a urethane bond-containing oligomer on the surface of the lithium transition metal oxide, and thereby side reactions caused by HF in the battery are minimized, capacity characteristics are improved, and adhesion between a positive electrode and a separator is enhanced to minimize the swelling phenomenon of batteries.

BEST MODE OF THE INVENTION

Figure 1:
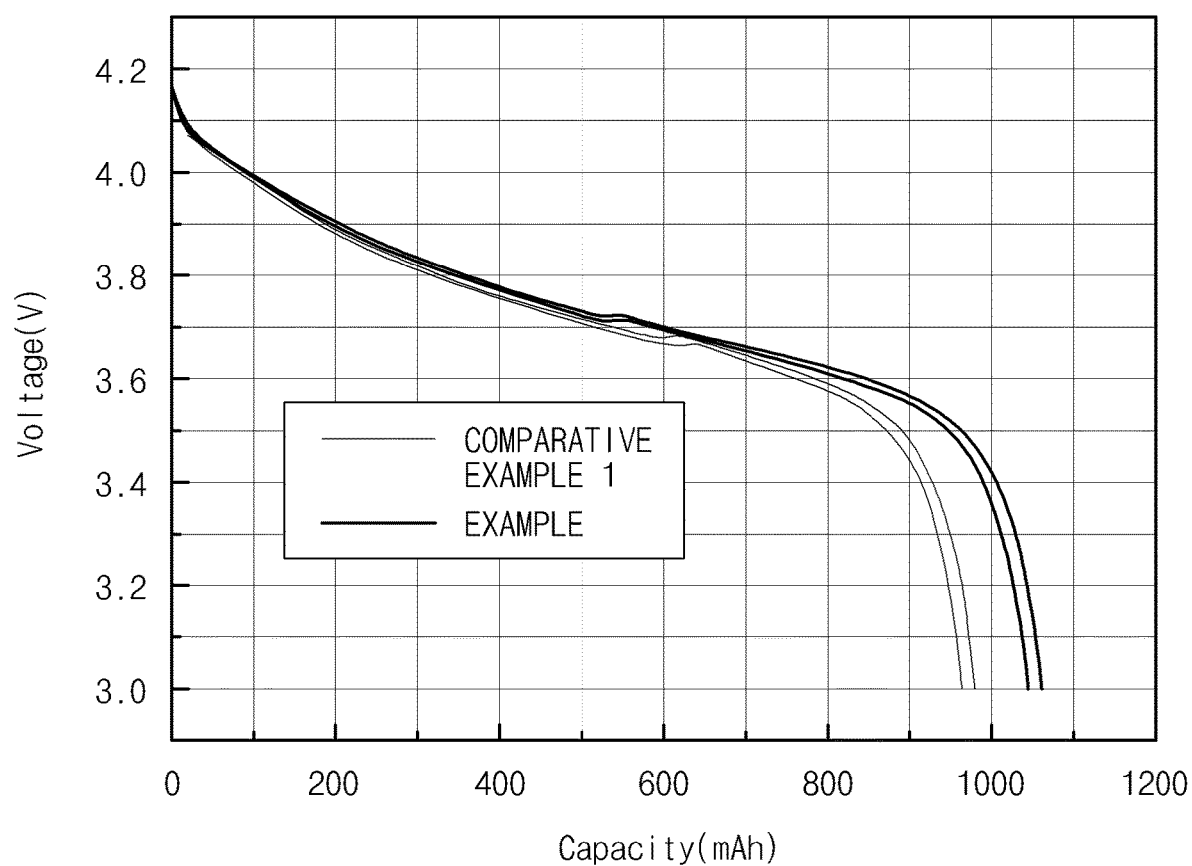
FIG. 1 is a graph showing a change in capacity of a lithium secondary battery according to an embodiment of the present invention and an existing lithium secondary battery (Experimental Example 1).

Hereinafter, the present invention will be described in detail to help understanding of the invention. The terms and words used in this specification and claims should not be interpreted as limited to commonly used meanings or meanings in dictionaries and should be interpreted with meanings and concepts which are consistent with the technological scope of the invention based on the principle that the inventors have appropriately defined concepts of terms in order to describe the invention in the best way. Therefore, since the embodiments described in this specification and configurations illustrated in drawings are only exemplary embodiments and do not represent the overall technological scope of the invention, it is understood that the invention covers various equivalents, modifications, and substitutions at the time of filing of this application.

In order to achieve the above-described objective, the present invention provides a composition for a gel polymer electrolyte including a solvent, a lithium salt and a first monomer represented by the following Formula 1.

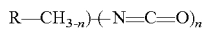

[Formula 1]

In Formula 1, R is a $C_{1-5}$ alkyl group, a $C_{1-20}$ aryl group, or a $C_{1-5}$ alkyl group or a $C_{1-20}$ aryl group including an acrylate group or a methacrylate group, and n is an integer of 1 to 3.

Specifically, the first monomer refers to an isocyanate group-containing monomer, and may include two or more of the isocyanate groups.

The gel polymer electrolyte is prepared by adding a monomer capable of forming a gel polymer by polymerization reaction to an electrolyte and performing polymerization. Here, the performance of the battery varies depending on 1) the mechanical strength, 2) ionic conductivity, 3) solvent retention ratio depending on charging and discharging or a temperature cycle, and the like of the gel polymer electrolyte.

The composition for a gel polymer electrolyte of the present invention includes the first monomer, and thus enables the preparation of a gel polymer electrolyte having excellent electrochemical stability, mechanical strength and lithium ion conductivity.

The first monomer may be one or more selected from the group consisting of isocyanate ethyl acrylate, isocyanate ethyl methacrylate, isocyanatobenzene, diisocyanate ethyl acrylate and diisocyanate ethyl methacrylate, and specifically may be isocyanate ethyl methacrylate.

Further, the composition for a gel polymer electrolyte may further include a second monomer, and the second monomer may include one or more functional groups selected from the group consisting of an acrylate group, a vinyl group, an epoxy group, an amino group, an amide group, an imide group, a hydroxyl group, a methylol group and a carboxyl group, and more preferably may include two or more acrylate groups.

Specifically, the second monomer may be dipentaerythritol pentaacrylate or dipentaerythritol triacrylate, and more specifically may be dipentaerythritol pentaacrylate.

The content of the first monomer of the present invention may be in the range of 0.2 to 5 wt % based on the composition for a gel polymer electrolyte. When the content of the first monomer is less than 0.2 wt %, it is difficult to expect the conversion rate of urethane reaction. When the content of the first monomer is more than 5 wt %, the residual amount of the first monomer not participating in the urethane reaction increases, which may act as a resistance component in batteries.

The content of the total monomers of the present invention, that is, the content of the first monomer and the second monomer may be in the range of 0.5 to 20 wt % based on the composition for a gel polymer electrolyte. When the content of the total monomers is less than 0.5 wt %, an effect as a crosslinking agent is insufficient, and gelation of a polymer is difficult, thereby deteriorating the mechanical properties of the electrolyte. When the content of the total monomers is more than 20 wt %, the monomers may remain in the electrolyte, and thus cell performance such as ionic conductivity may be deteriorated.

The monomers may be polymerized to form a polymeric matrix having a planar or networked structure, and specifically, the second monomer containing two or more acrylate groups may form a polymeric matrix having a networked structure.

Further, the second monomer containing a vinyl group is generally easily dissolved in an organic solvent, and thus has excellent affinity with the electrolyte, and forms a polymeric matrix having a planar and/or networked structure to improve mechanical strength. The polymer may be a polymer having a low glass transition temperature (Tg) or elasticity.

Further, a compound having an acrylate group and a hydroxyl group contains an ester group, and thus has excellent affinity between a carbonate and a linear saturated ester used as the electrolyte, thereby preventing desorption phenomenon of an electrolyte solvent which may occur during charging and discharging. Further, the compound can improve lithium ion conductivity in the battery due to containing a lot of oxygen with polarity.

Further, the composition for a gel polymer electrolyte of the present invention may further include an additive to enhance flame retardancy and reactivity and to reduce resistance.

For example, pyridine, triethylphosphite, (2,2,2)-triethylfluorophosphite, triethanolamine, cyclic ether, ethylenediamine, n-glyme, hexaphosphoric triamide, nitrobenzene derivatives, sulfur, quinone imine dyes, N-substituted oxazolidinones, N,N-substituted imidazolidines, ethylene glycol dialkyl ether, ammonium salts, pyrrole and the like may be added.

Further, the composition for a gel polymer electrolyte of the present invention may further include a polymerization initiator, and non-limiting examples of the polymerization initiator include benzoyl peroxide, acetyl peroxide, dilauryl peroxide, di-tert-butylperoxide, t-butyl peroxy-2-ethylhexanoate, cumyl hydroperoxide, hydrogen peroxide, azo compounds such as 2,2-azobis(2-cyanobutane), 2,2-azobis(methylbutyronitrile), azobis(isobutyronitrile) (AIBN), azobisdimethyl-valeronitrile (AMVN), etc. The polymerization initiator may be decomposed by heat to form a radical, and react with a polymerizable monomer by free radical polymerization to form a gel polymer electrolyte.

Moreover, the content of the polymerization initiator may be in the range of 0.1 to 3 wt % based on the content of the total monomers. When the content of the polymerization initiator is less than 0.1 wt %, a gel conversion rate may be lowered, and a reaction time may also be prolonged. When the content of the polymerization initiator is more than 3 wt %, there may be a problem of the polymerization initiator itself, for example, a problem of elution of copper (Cu) in the case of a peroxide-based polymerization initiator, and a problem of generation of nitrogen gas in the case of an azo-based polymerization initiator.

The solvent included in the composition for a gel polymer electrolyte of the present invention is not particularly limited as long as it is a common non-aqueous electrolyte, and representative examples thereof include a cyclic carbonate, a linear carbonate, a lactone, an ether, an ester, a sulfoxide, an acetonitrile, a lactam, a ketone, etc.

Here, examples of the cyclic carbonate include ethylene carbonate (EC), propylene carbonate (PC), butylene carbonate (BC), fluoroethylene carbonate (FEC) and the like, and examples of the linear carbonate include diethyl carbonate (DEC), dimethyl carbonate (DMC), dipropyl carbonate (DPC), ethyl methyl carbonate (EMC), methyl propyl carbonate (MPC) and the like. An example of the lactone includes gamma butyrolactone (GBL), and examples of the ether include dibutyl ether, tetrahydrofuran, 2-methyltetrahydrofuran, 1,4-dioxane, 1,2-dimethoxyethane, 1,2-diethoxyethane and the like. Examples of the ester include ethyl formate, ethyl formate, propyl formate, methyl acetate, ethyl acetate, propyl acetate, methyl propionate, ethyl propionate, butyl propionate, methyl pivalate and the like.

Further, an example of the sulfoxide includes dimethyl sulfoxide, an example of the lactam is N-methyl-2-pyrrolidone (NMP), and an example of the ketone includes polymethyl vinyl ketone. Further, halogen derivatives of the above-described organic solvents may also be used. These organic solvents may be used alone or in combination.

A lithium salt included in the composition for a gel polymer electrolyte of the present invention is not particularly limited as long as it is a lithium salt or lithium imide salt usable as a common electrolyte salt. Specific examples thereof may be one or more selected from the group consisting of $LiPF_6$, $LiAsF_6$, $LiCF_3SO_3$, $LiN(CF_3SO_2)_2$, $LiBF_4$, $LiSbF_6$, $LiN(C_2F_5SO_2)_2$, $LiAlO_4$, $LiAlCl_4$, $LiCO_{0.2}Ni_{0.56}Mn_{6.27}O_2$, $LiCoO_3$, $LiSO_3CF_3$ and $LiClO_4$, and the content of the lithium salt may be in the range of 10 to 20 wt % based on the composition for a gel polymer electrolyte.

In the composition for a gel polymer electrolyte of the present invention, an isocyanate-containing monomer is introduced to a composition for a gel polymer electrolyte to induce a urethane reaction with LiOH on a surface of a lithium transition metal oxide to form a coating layer including a urethane bond-containing oligomer on the surface of the lithium transition metal oxide.

Accordingly, the present invention may provide a positive electrode including a lithium transition metal oxide; and a coating layer including a urethane bond-containing oligomer represented by the following Formula 2 on the surface of the lithium transition metal oxide.

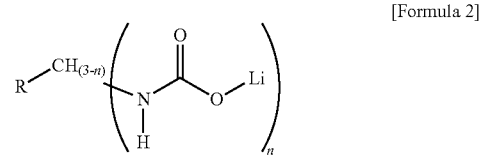

[Formula 2]

In Formula 2, R is a $C_{1-5}$ alkyl group, a $C_{1-20}$ aryl group, or a $C_{1-5}$ alkyl group or a $C_{1-20}$ aryl group including an acrylate group or a methacrylate group, and n is an integer of 1 to 3.

Specifically, the coating layer includes a urethane bond-containing oligomer represented by the following Formula 3 or 4.

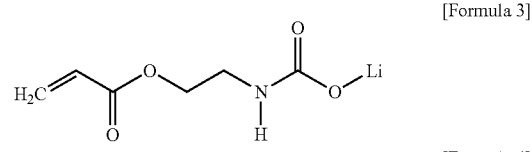

[Formula 3]

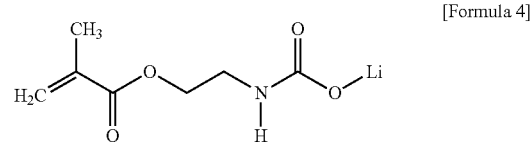

[Formula 4]

Formula 3 represents a urethane bond-containing oligomer prepared by the urethane reaction between isocyanate ethyl acrylate and LiOH, and Formula 4 represents a urethane bond-containing oligomer prepared by the urethane reaction between isocyanate ethyl methacrylate and LiOH.

The urethane bond has high electrochemical stability to stabilize anions of the electrolyte salt, thereby minimizing side reactions caused by HF in the battery, and improving capacity characteristics accordingly.

Particularly, the urethane reaction is performed on a surface of a lithium transition metal oxide to form a coating layer including a urethane bond-containing oligomer on the surface of the lithium transition metal oxide, and thereby the composition for a gel polymer electrolyte of the present invention can have more enhanced adhesion between the positive electrode and the separator as compared with the conventional composition for a gel polymer electrolyte.

For example, the lithium transition metal oxide of the present invention may be a mixture of one or more selected from the group consisting of $Li_xCoO_2$ (0.5<x<1.3), $Li_xNiO_2$ (0.5<x<1.3), $Li_xMnO_2$ (0.5<x<1.3), $Li_xMn_2O_4$ (0.5<x<1.3), $Li_x(Ni_aCo_bMn_c)O_2$ (0.5<x<1.3, 0<a<1, 0<b<1, 0<c<1, a+b+c=1), $Li_xNi_{1-y}Co_yO_2$ (0.5<x<1.3, 0<y<1), $Li_xCo_{1-y}Mn_yO_2$ (0.5<x<1.3, 0≤y<1), $Li_xNi_{1-y}Mn_yO_2$(0.5<x<1.3, O<y<1), $Li_x(Ni_aCo_bMn_c)O_4$ (0.5<x<1.3, 0<a<2, 0<b<2, 0<c<2, a+b+c=2), $Li_xMn_{2-z}Ni_zO_4$(0.5<x<1.3, 0<z<2), $Li_xMn_{2-z}Co_zO_4$ (0.5<x<1.3, 0<z<2), $Li_xCoPO_4$ (0.5<x<1.3) and $Li_xFePO_4$ (0.5<x<1.3).

Particularly, an excess amount of LiOH by-products is formed on the surface of lithium transition metal oxide in the present invention. The excessively formed LiOH reacts with the first monomer with a higher probability such that a coating layer including a urethane bond-containing oligomer can be formed on the surface of the lithium transition metal oxide.

Conventionally, LiOH has been regarded as an impurity formed in the preparation of a positive electrode active material, and the lithium impurity was removed through a process such as washing with water, filtration, drying and the like. However, in the present invention, it is unnecessary for LiOH formed on the surface of the lithium transition metal oxide to be removed through a separate process because LiOH serves as a reactant of the urethane reaction.

Further, in order to form an excess amount of the LiOH, lithium hydroxide (LiOH) may be mainly used among lithium compounds including lithium carbonate ($Li_2CO_3$), lithium hydroxide (LiOH), lithium nitrate ($LiNO_3$), lithium hydrate ($LiOH.H_2O$) and the like, as a lithium source when preparing the positive electrode active material.

Here, an excess amount of LiOH may be allowed to remain by increasing the particle size of LiOH used as the lithium source or lowering a calcination temperature to decrease the reactivity of LiOH.

For example, when lithium cobalt oxide having a relatively high calcination temperature of about 1,000° C. is prepared, an excess amount of LiOH may remain by calcination at a temperature less than 1,000° C.

Further, an excess amount of LiOH may be formed by controlling the type of gas used, such as using a gas including an increased content of oxygen and a reduced content of carbon dioxide during a calcination process.

The coating layer may be more easily formed when the first monomer containing two or more isocyanate groups is used in a specific amount or more.

As described above, the positive electrode including the urethane bond-containing oligomer can minimize side reactions caused by HF in the battery, improve capacity characteristics, and increase adhesion between the positive electrode and the separator to minimize the swelling phenomenon of batteries.

Further, methods of polymerization reaction and gelation of the gel polymer electrolyte of the present invention are not particularly limited, and may be performed according to conventional methods known in the related field.

The polymerization reaction may be carried out by heat, an E-beam, a gamma ray, and an aging process at room temperature and high temperature.

In the present invention, it is preferable to perform the polymerization reaction under an inert condition. When the polymerization reaction is performed under an inert condition, the reaction of radicals with oxygen in the atmosphere, which is a radical scavenging agent, is essentially blocked so that the extent of polymerization reaction can be increased to such an extent that there is almost no monomer as an unreacted crosslinking agent. Accordingly, deterioration of charge and discharge performance caused by a large amount of unreacted monomers remaining in the battery can be prevented.

As the inert condition, a gas having low reactivity known in the related field may be used, and particularly, at least one inert gas selected from the group consisting of nitrogen, argon, helium and xenon may be used.

The gelation method is a liquid-injection type gelation method in which gelation is carried out at a high temperature of about 65° C. or more for 5 hours or more in a state where all the oxygen in the battery is removed after injection of a liquid, and the detailed conditions may vary depending on the polymerization initiator.

Further, an embodiment of the present invention provides a lithium secondary battery including the positive electrode according to the present invention, a negative electrode, a separator and a gel polymer electrolyte.

In the lithium secondary battery of the present invention, an isocyanate-containing monomer is introduced to a composition for a gel polymer electrolyte to induce a urethane reaction with LiOH on a surface of a lithium transition metal oxide to form a coating layer including a urethane bond-containing oligomer on the surface of the lithium transition metal oxide, and thereby side reactions caused by HF in the battery are minimized, capacity characteristics are improved, and adhesion between a positive electrode and a separator is enhanced to minimize the swelling phenomenon of the battery.

An electrode of a lithium secondary battery may be produced using conventional methods known in the related field. For example, a slurry is prepared by mixing an electrode active material with a solvent, and a binder, a conductive material and a dispersant as necessary and stirring, and then is applied onto a metal current collector and dried to produce an electrode.

As the electrode active material, a positive electrode active material or a negative electrode active material may be used.

As the positive electrode active material, a lithium-containing transition metal oxide may be preferably used, as described above.

Examples of the negative electrode active material include a carbon material capable of reversibly intercalating and deintercalating lithium ions, a lithium metal, silicon, tin and the like. The carbon material may be preferably used, and both low-crystalline carbon and highly-crystalline carbon may be used as the carbon material. Representative examples of the low-crystalline carbon include soft carbon and hard carbon, and representative examples of the highly-crystalline carbon include natural graphite, Kish graphite, pyrolytic carbon, mesophase pitch based carbon fiber, mesocarbon microbeads, mesophase pitches, and high-temperature sintered carbon such as petroleum- or coal tar pitch-derived cokes.

Any metal may be used as the metal current collector as long as the metal is highly conductive, is capable of being easily bonded with the slurry of the electrode active material, and is not reactive in the voltage range of the battery. Non-limiting examples of a positive electrode current collector include aluminum, nickel or a foil prepared by a combination thereof, and non-limiting examples of a negative electrode current collector include foils prepared from copper, gold, nickel, aluminum alloys, or combinations thereof.

The conductive material is not particularly limited as long as it is generally used in the related field, and examples thereof include artificial graphite, natural graphite, carbon black, acetylene black, Ketjen black, Denka black, thermal black, channel black, carbon fiber, metal fiber, aluminum, tin, bismuth, silicon, antimony, nickel, copper, titanium, vanadium, chromium, manganese, iron, cobalt, zinc, molybdenum, tungsten, silver, gold, lanthanum, ruthenium, platinum, iridium, titanium oxide, polyaniline, polythiophene, polyacetylene, polypyrrole or combinations thereof. Generally, a carbon black-based conductive material may be frequently used.

As the binder, binders which may be commonly used in the related field are used, and any type of known binders may be applied without limitation. Generally, polyvinylidene fluoride (PVdF), a copolymer of polyhexafluoropropylene-polyvinylidene fluoride (PVdF/HFP), poly(vinyl acetate), polyvinyl alcohol, polyethylene oxide, polyvinylpyrrolidone, alkylated polyethylene oxide, polyvinyl ether, poly(methyl methacrylate), poly(ethyl acrylate), polytetrafluoroethylene (PTFE), polyvinyl chloride, polyacrylonitrile, polyvinylpyridine, a styrene-butadiene rubber, an acrylonitrile-butadiene rubber, an ethylene propylene diene monomer (EPDM) or mixtures thereof may be used.

Further, the separator may be a porous polymer film, for example, a porous polymer film formed of a polyolefin-based polymer such as an ethylene homopolymer, a propylene homopolymer, an ethylene/butene copolymer, an ethylene/hexene copolymer and an ethylene/methacrylate copolymer, or a laminated structure of two or more thereof may be used. In addition, nonwoven fabrics formed of conventional porous nonwoven fabrics such as high-melting-point glass fibers, polyethylene terephthalate fibers and the like may be used, but the present invention is not limited thereto.

The lithium secondary battery according to an embodiment of the present invention may be a cylindrical-, square-, or pouch-type secondary battery, but is not limited thereto as long as the lithium secondary battery is a charging/discharging device.

Further, an embodiment of the present invention provides a battery module including the lithium secondary battery as a unit battery and a battery pack including the battery module.

Modes of the Invention

Now, the present invention will be described in more detail with reference to the following examples. These examples are provided only for illustration of the present invention and should not be construed as limiting the scope and spirit of the present invention.

EXAMPLE

1) Preparation of Composition for Gel Polymer Electrolyte $LiPF_6$ was dissolved in an organic solvent containing ethylene carbonate (EC), propylene carbonate (PC) and ethyl methyl carbonate (EMC) in a weight ratio of 3:2:5 to have a concentration of 1 M, and thereby a mixed solution was prepared. 2.5 wt % of isocyanate ethyl methacrylate and 0.2 wt % of dipentaerythritol pentaacrylate based on a composition for a gel polymer electrolyte were added as first and second monomers to 100 parts by weight of the mixed solution. Thereafter, 3.0 wt % of succinonitrile (SN) as an additive to the total monomer content and 0.2 wt % of AIBN as a polymerization initiator were added to prepare a composition for a gel polymer electrolyte.

2) Manufacture of Lithium Secondary Battery $Co_2O_3$ as a cobalt oxide precursor and LiOH which is a lithium compound were mixed at a weight ratio of 50:50 and then calcined at 900° C. for 6 hours to prepare $LiCoO_2$.

96 parts by weight of $LiCoO_2$ thus prepared as a positive electrode active material, 2 parts by weight of carbon black as a conductive material and 2 parts by weight of polyvinylidene fluoride (PVdF) as a binder were added into N-methyl-2-pyrrolidone (NMP) as a solvent to prepare a positive electrode mixture slurry. The positive electrode mixture slurry was applied to an aluminum (Al) thin film as a positive electrode current collector having a thickness of about 20 μm and dried to prepare a positive electrode, followed by roll pressing to process the positive electrode.

Further, 96.3 parts by weight of carbon powder as a negative electrode active material, 1 part by weight of a styrene-butadiene rubber (SBR) as a binder, 1.5 parts by weight of CMC as a thickening agent and 1.2 parts by weight of carbon black as a conductive material were added to NMP as a solvent to prepare a negative electrode mixture slurry. The negative electrode mixture slurry was applied to a copper (Cu) thin film as a negative electrode current collector having a thickness of about 10 μm and dried to prepare a negative electrode, followed by roll pressing to process the negative electrode.

The positive electrode and the negative electrode thus produced were combined with a separator including three layers of polypropylene/polyethylene/polypropylene (PP/PE/PP) to prepare a polymer type battery, and then the prepared composition for a gel polymer electrolyte was injected to complete manufacture of a lithium secondary battery.

Comparative Example

A lithium secondary battery was manufactured in the same manner as in the example except that only dipentaerythritol pentaacrylate as a monomer was used in an amount of 2.5 wt % based on the composition for a gel polymer electrolyte.

Experimental Example 1. Evaluation of Capacity Characteristics of Batteries

In order to evaluate discharge capacity characteristics of lithium secondary batteries, the lithium secondary batteries manufactured in the example and comparative example were charged at room temperature until a voltage reached 4.1 V, and were discharged at a current of 0.2 C under a constant current (CC) condition until a voltage reached 3.0 V, and thereby the discharge capacity thereof was measured.

As shown in FIG. 1, in the case of the example including the composition for a gel polymer electrolyte of the present invention, discharge capacity was excellent as compared with the comparative example.

This is because the battery performance was improved due to minimized side reactions caused by HF in the battery by introducing an isocyanate-containing monomer to the composition for a gel polymer electrolyte to induce a urethane reaction with LiOH on a surface of a lithium transition metal oxide to form a coating layer including a urethane bond-containing oligomer on the surface of the lithium transition metal oxide.

Experimental Example 2. Evaluation of Interface Resistance of Batteries

Figure 2:
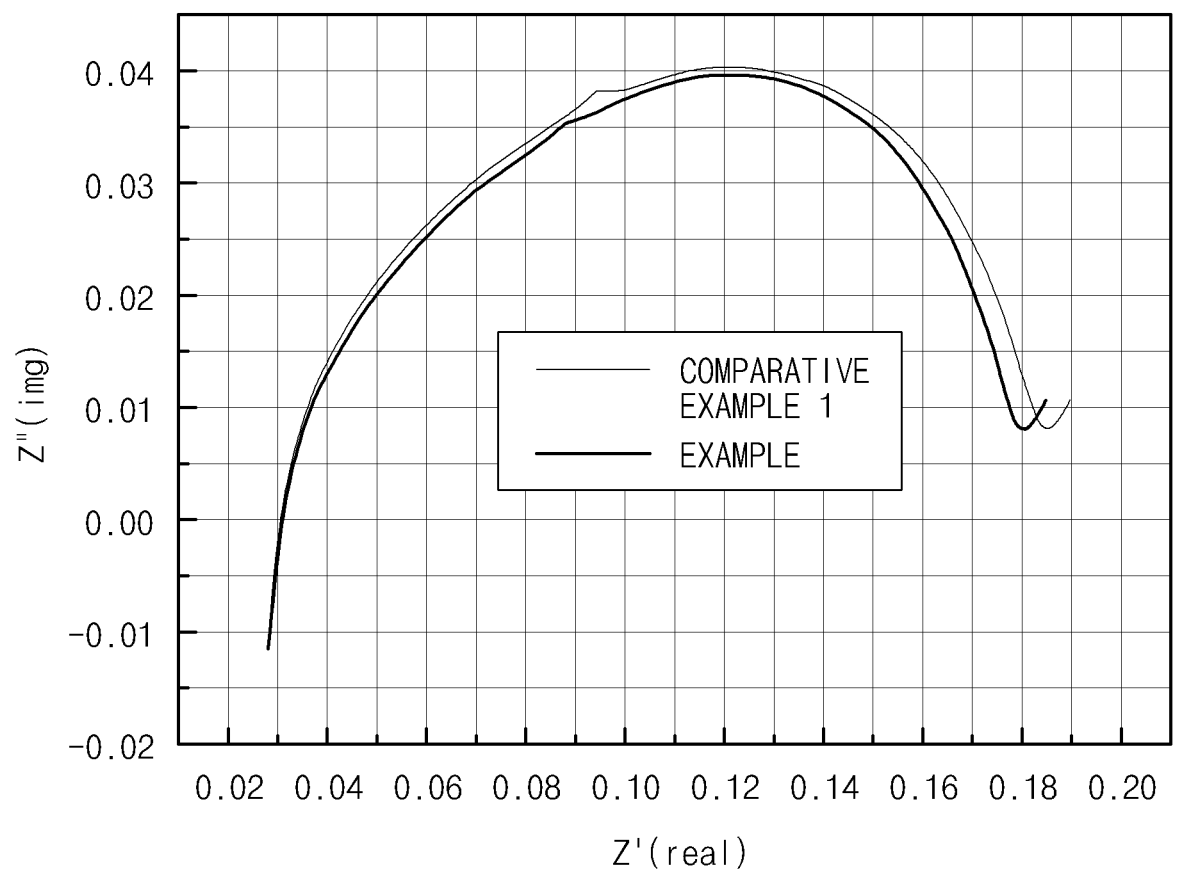
FIG. 2 is a graph showing a change in interface resistance of a lithium secondary battery according to an embodiment of the present invention and an existing lithium secondary battery (Experimental Example 2).

In order to evaluate the interfacial resistance of lithium secondary batteries, the resistance change rate of lithium secondary batteries manufactured in the example and comparative example according to state of charge (SOC) of 50 was measured using an electrochemical impedance spectroscopy (EIS) measurement device using an alternating current impedance while changing the frequency of a small voltage of 10 mV to $10^6$ to $10^{-4}$ Hz. The graph shown in FIG. 2 is referred to as a Nyquist plot as a vector diagram on a complex number plane. An R value for a semicircle after measurement was used to represent the interface resistance.

As shown in FIG. 2, in the case of the example including the composition for a gel polymer electrolyte of the present invention, a smaller semicircle than the comparative example is shown, which represents that, in the case of the example including the composition for a gel polymer electrolyte of the present invention, the resistance of the electrode was reduced and diffusion of lithium ions was improved as compared with the comparative example.

This is because the battery perform lance was improved due to minimized side reactions caused by HF in the battery by introducing an isocyanate-containing monomer to the composition for a gel polymer electrolyte to induce a urethane reaction with LiOH on a surface of a lithium transition metal oxide to form a coating layer including a urethane bond-containing oligomer on the surface of the lithium transition metal oxide.

Experimental Example 3. Evaluation of Adhesion of Electrode

In order to evaluate adhesion of an electrode of a lithium secondary battery, a commonly known 180° peel test was performed on the lithium secondary batteries manufactured in the example and comparative example, in which, while pulling the tape at a rate of 10 mm/min, the force (gf) applied until the electrode was separated was measured and compared.

In the case of the example including the composition for a gel polymer electrolyte of the present invention, a force of 80 to 90 gf was shown, while a force of 40 to 50 gf was shown in the comparative example. Accordingly, it can be found that the example including the composition for a gel polymer electrolyte of the present invention shows more excellent adhesion with an electrode as compared with the comparative example.

This is because an isocyanate-containing monomer is introduced to perform the urethane reaction with LiOH on the surface of the lithium transition metal oxide to form a coating layer including a urethane bond-containing oligomer on the surface of the positive electrode.

While the preferred embodiments of the present invention have been described above in detail, the scope of embodiments of the present invention is not limited thereto, but encompasses several modifications and improvements by those skilled in the related field using basic concepts of embodiments of the present invention defined by the appended claims.

The invention claimed is:

1. An electrolyte composition for a gel polymer electrolyte, comprising:
   a solvent;
   a lithium salt; and
   a first monomer represented by the following Formula 1:

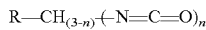  [Formula 1]

in Formula 1,
   R is a $C_{1-5}$ alkyl group including an acrylate group or a methacrylate group or a $C_{1-20}$ aryl group including an acrylate group or a methacrylate group, and
   n is an integer of 2 to 3, and
   a second monomer, wherein the second monomer includes one or more functional groups selected from the group consisting of an acrylate group, a vinyl group, an epoxy group, an amino group, an amide group, an imide group, a hydroxyl group, a methylol group and a carboxyl group,
   wherein a content of the first monomer is in a range of 0.2 to 5 wt % based on the electrolyte composition, and
   wherein a content of the first monomer and the second monomer is in a range of 0.5 to 20 wt % based on the electrolyte composition.

2. The electrolyte composition according to claim 1, wherein the first monomer is one or more selected from the group consisting of diisocyanate ethyl acrylate and diisocyanate ethyl methacrylate.

3. The electrolyte composition according to claim 1, wherein the second monomer includes two to five acrylate groups.

4. The electrolyte composition according to claim 3, wherein the second monomer is dipentaerythritol pentaacrylate or dipentaerythritol triacrylate.

5. The electrolyte composition according to claim 1, further comprising a polymerization initiator.

6. The electrolyte composition according to claim 5, wherein the polymerization initiator is one or more selected from the group consisting of benzoyl peroxide, acetyl peroxide, dilauryl peroxide, di-tert-butylperoxide, t-butyl peroxy-2-ethyl-hexanoate, cumyl hydroperoxide, hydrogen peroxide, 2,2-azobis(2-cyanobutane), 2,2-azobis(methylbutyronitrile), azobis(isobutyronitrile) (AIBN) and azobisdimethyl-valeronitrile (AMVN).

7. The electrolyte composition according to claim 5, wherein a content of the polymerization initiator is in a range of 0.1 to 3 wt % based on a total content of the total monomers.

8. The electrolyte composition according to claim 1, wherein the solvent is one or more selected from the group consisting of a cyclic carbonate, a linear carbonate, a lactone, an ether, an ester, a sulfoxide, an acetonitrile, a lactam, a ketone and a halogen derivative thereof.

9. The electrolyte composition according to claim 1, wherein the lithium salt is one or more selected from the group consisting of $LiPF_6$, $LiAsF_6$, $LiCF_3SO_3$, $LiN(CF_3SO_2)_2$, $LiBF_4$, $LiSbF_6$, $LiN(C_2F_5SO_2)_2$, $LiAlO_4$, $LiAlCl_4$, $LiCo_{0.2}Ni_{0.56}Mn_{0.27}O_2$, $LiCoO_2$, $LiSO_3CF_3$ and $LiClO_4$.

10. A lithium secondary battery comprising a positive electrode, a negative electrode, a separator and the electrolyte composition for the gel polymer electrolyte of claim 1.

* * * * *